United States Patent [19]
Gallager, Jr.

[11] 3,710,303
[45] Jan. 9, 1973

[54] EDGE CONNECTOR

[75] Inventor: Jacob Boon Gallager, Jr., Cherry Hill, N.J.

[73] Assignee: RCA Corporation

[22] Filed: Sept. 13, 1971

[21] Appl. No.: 180,072

Related U.S. Application Data

[63] Continuation of Ser. No. 872,943, Oct. 31, 1969, abandoned.

[52] U.S. Cl. .............339/61 M, 339/17 L, 339/74 R, 339/75 MP, 339/176 MP

[51] Int. Cl. ......H05k 1/07, H01r 13/54, H01r 13/62

[58] Field of Search ...339/59 M, 61 M, 17 L, 17 LC, 339/17 LM, 17 F, 17 M, 176 MF, 176 MP, 75 M, 75 MP, 217 S, 114, 143, 74

[56] References Cited

UNITED STATES PATENTS

| | | | |
|---|---|---|---|
| 2,946,033 | 7/1960 | Wirth | 339/17 |
| 3,130,351 | 4/1964 | Giel | 317/101 |
| 3,401,369 | 9/1968 | Palmateer et al. | 339/17 |
| 3,464,054 | 8/1969 | Mansfield | 339/176 |
| 3,478,301 | 11/1969 | Conrad et al. | 339/75 |

OTHER PUBLICATIONS

Uberbacher et al., IBM Tech. Disclosure, "Split Socket," Vol. 8, No. 8, January 1966, Page 1058.

Hill et al., IBM Tech. Disclosure, "Low Voltage Pluggable Conn." Vol. 8, No. 12, May 1966, Page 1725.

*Primary Examiner*—Marvin A. Champion
*Assistant Examiner*—Lawrence J. Staab
*Attorney*—Edward J. Norton

[57] ABSTRACT

An edge connector for a printed circuit board includes a housing detachably secured to a plurality of contact elements. A conductor is provided within the housing to form a transmission line with the contact elements. The transmission line thus formed has a characteristic impedance equal to that of the circuitry associated with the respective contact elements. Cam surface projections are included which shift the contact elements beyond the insertion path of the circuit board in response to the insertion of the board into the connector. The conductor which provides the characteristic impedance cooperates with the shifting projection to secure the housing to the contact elements and to provide a spring load on the housing for returning the housing to the unshifted state.

19 Claims, 12 Drawing Figures

INVENTOR.
Jacob B. Gallager, Jr.
BY
Edward J. Norton
ATTORNEY

INVENTOR.
Jacob B. Gallager, Jr.
BY
Edward J. Norton
ATTORNEY

INVENTOR.
Jacob B. Gallager, Jr.
BY
Edward J Norton
ATTORNEY

INVENTOR.
Jacob B. Gallager, Jr.
BY
Edward J. Norton
ATTORNEY

EDGE CONNECTOR

This a continuation of application Ser. No. 872,943 filed Oct. 31, 1969, and now abandoned.

This invention relates to edge connectors for printed circuit boards.

Known edge connectors for printed circuit boards include a channel in an insulating housing adapted to receive an edge of a printed circuit board, the edge functioning as a male plug. Communicating with the channel are a plurality of spaced contact elements, each of which includes a resilient contact portion which registers with a foil conductor on the printed circuit board when the board is inserted into the channel. Each of the contact elements also includes a terminal portion which extends from the housing through the channel bottom. The housing and contact elements are secured to each other such that the elements may only be removed one by one (if they can be removed at all) by slipping the free terminal portion through the channel bottom wall into the channel. However, once the terminal portions are connected to a lead or otherwise secured, the elements then are no longer readily detached from the housing.

In certain instances, such connectors have the terminal portions of the contact element soldered to foil conductors on printed circuit boards. In these instances, attempts to unsolder the foil-element joint to detach the connector from the circuit board or detach the contact element from the connector, usually destroys the foil on the board. At best, to unsolder and remove a plurality of contact elements soldered or otherwise secured in place, is a cumbersome task.

Another limitation of edge connectors is a result of the wear of the conductor foil on the inserted circuit boards due to the sliding fraction between the contact elements and the conductor foil. This friction causes premature failure of the foil and the electrical connection thereof with the contact elements. A further limitation is that imposed by the practical limit on the number of elements possible in a connector due to the insertion forces between the contact element and the inserted printed circuit board.

Still another limitation on such connectors is that which arises in systems where very high speed, fast risetime signals are processed. The circuitry in such systems usually is capacitively coupled to a point of reference potential for the purpose of maintaining signal integrity. This capacitive coupling usually is not properly provided in the prior art at the point of interconnection between the edge connector contact elements and the printed circuit foils. Impedance discontinuities (mismatch) at each of the connections due to the absence of uniform capacitive coupling to a point of reference potential limit system signal processing speeds.

Therefore, it is an object of the present invention to provide a connector which is substantially free of one or more of the above mentioned limitations.

In accordance with an embodiment of the present invention, an electrical edge connector for a printed circuit board includes a set of flexible electrical contact elements and an insulating connector housing for receiving a printed circuit board edgewise therein, the housing being removably attached to the contact elements, the elements being secured in a predetermined arrangement when the housing is attached thereto.

Means are connected to the housing for shifting the contact elements beyond the insertion path of the circuit board in response to the insertion of the board into the housing to substantially reduce sliding friction between the contact elements and the circuit board.

Means within the housing adjacent the contact elements include a conductor for providing a predetermined impedance between each respective one of the contact elements and said conductor. Additionally, means are provided for connecting the conductor to a source of reference potential.

In accordance with another embodiment of the present invention, a multi-contact electrical connector secures a first printed circuit board to a second printed circuit board and couples the conductors of the boards to each other, the connector covering a portion of the conductors of the latter board when secured thereto. The connector includes a set of elongated flexible electrically conductive contact elements, and an insulating connector housing defining a channel therein for receiving a printed circuit board edgewise, the housing being removably attached to the contact elements which are secured in a predetermined arrangement when the housing is attached thereto, the conductors of the second printed circuit board being exposed upon detaching the housing from the elements.

In accordance with another embodiment of the present invention, an electrical edge connector for a printed circuit board includes a set of elongated flexible conductive contact elements fixed in substantially parallel spaced relationship.

An insulating body defining a channel therein includes means for securing the contact elements in the fixed spaced relationship within said channel, and means connected to the housing for shifting the contact elements beyond the insertion path of the leading edge of the circuit board in response to the insertion of the board into the channel.

Still another embodiment of the present invention includes an electrical connector for securing a first printed circuit board inserted edgewise therein to a second printed circuit board and for coupling the conductors of the boards to each other. The connector includes a set of elongated conductive contact elements fixed in substantially parallel spaced relationship. An insulating housing is provided for securing the contact elements in the fixed spaced relationship. Means within the housing adjacent the contact are provided which include a conductor for providing a predetermined impedance between each of the contact elements and the conductor. Further means are included for connecting the conductor to a source of reference potential.

Other objects, features and advantages of the present invention will be apparent from the following description taken in conjunction with the accompanying drawings in which.

Figures 1, 2, 3:
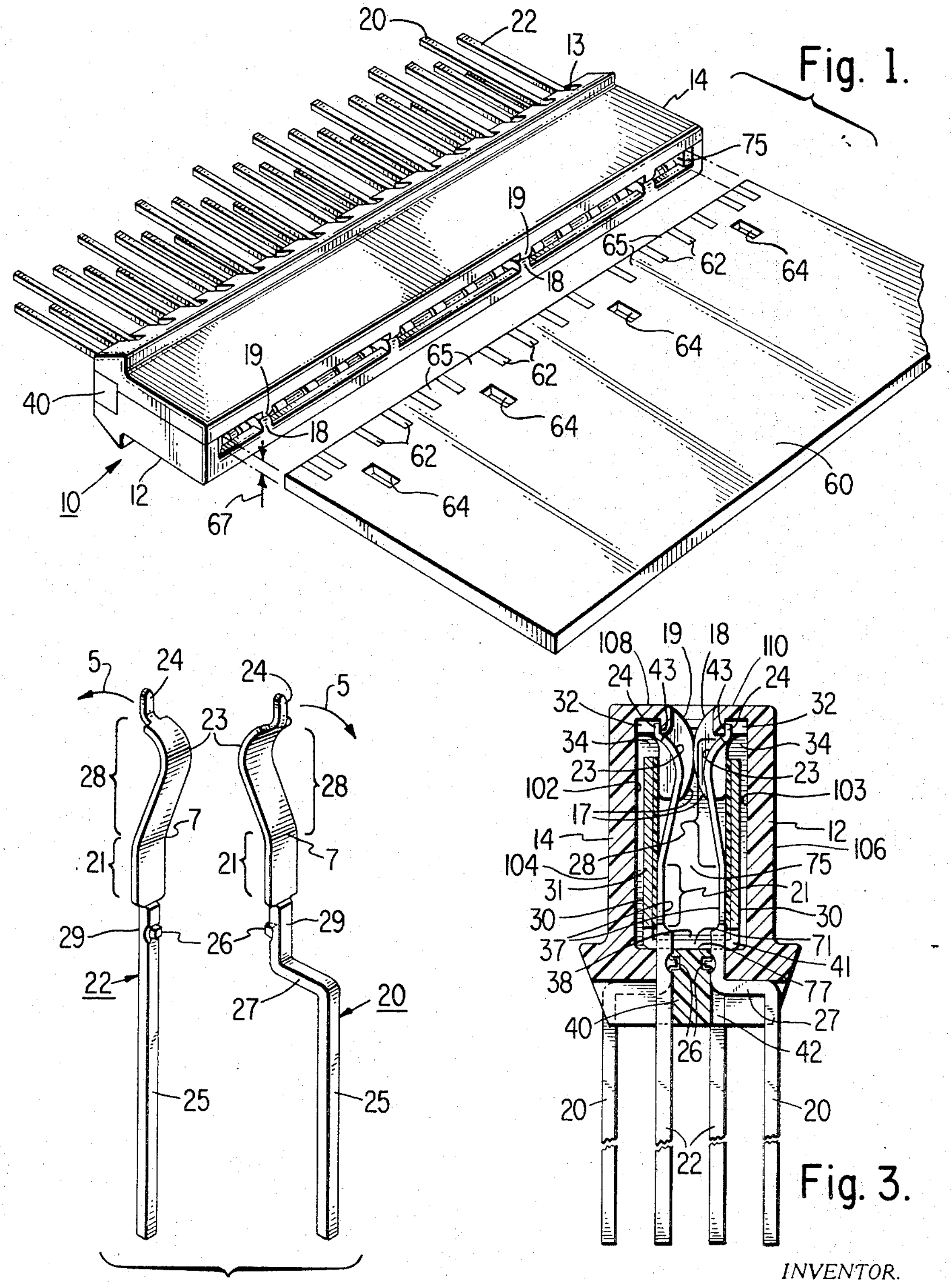
FIG. 1 is a perspective view of an edge connector according to a preferred embodiment of the invention.
FIG. 2 is a perspective illustration of a pair of contact elements which may be employed in the connector of FIG. 1.
FIG. 3 is a cross sectional view of the connector of FIG. 1.

The connector 10 shown in FIG. 1 preferably includes an insulating housing comprising two side wall members 12 and 14 and an interconnecting member 40. The connector 10 of FIG. 1 is shown in perspective with a printed circuit board 60 which is in position for insertion into connector channel 75. The connector 10 includes contact elements 20 and 22 described below.

In the illustrative embodiments of FIGS. 1 through 10, connector housing members 12 and 14 each form a side 102 and 103 respectively (FIG. 2) of channel 75. As shown by FIG. 3, each of the side walls 12 and 14 includes a plurality of recesses 32 communicating with channel 75 and adapted to receive projections 24 on elements 20 and 22 in a manner to be described.

Referring to FIG. 2, the contact elements 20 and 22 each include a resilient portion 28 having a convex flexible bight 23 terminating adjacent projection 24 at one end of the element. Between resilient portion 28 and terminal portion 25 is projection 26 which extends outwardly from the element shank 29 in the same general direction as the bight 23.

Bight 23 is shown as a bowed spring member forming resilient portion 28, which functions as a conventional contact spring member. Element 20 differs from element 22 in that a shoulder 27 in element 20 is spaced between projection 26 and terminal portion 25, the shoulder 27 being provided to space terminal portion 25 in a predetermined arrangement. The contact elements, when attached to the housing, are disposed such that the convex bight 23 of each element faces into the channel.

Figures 6, 7:
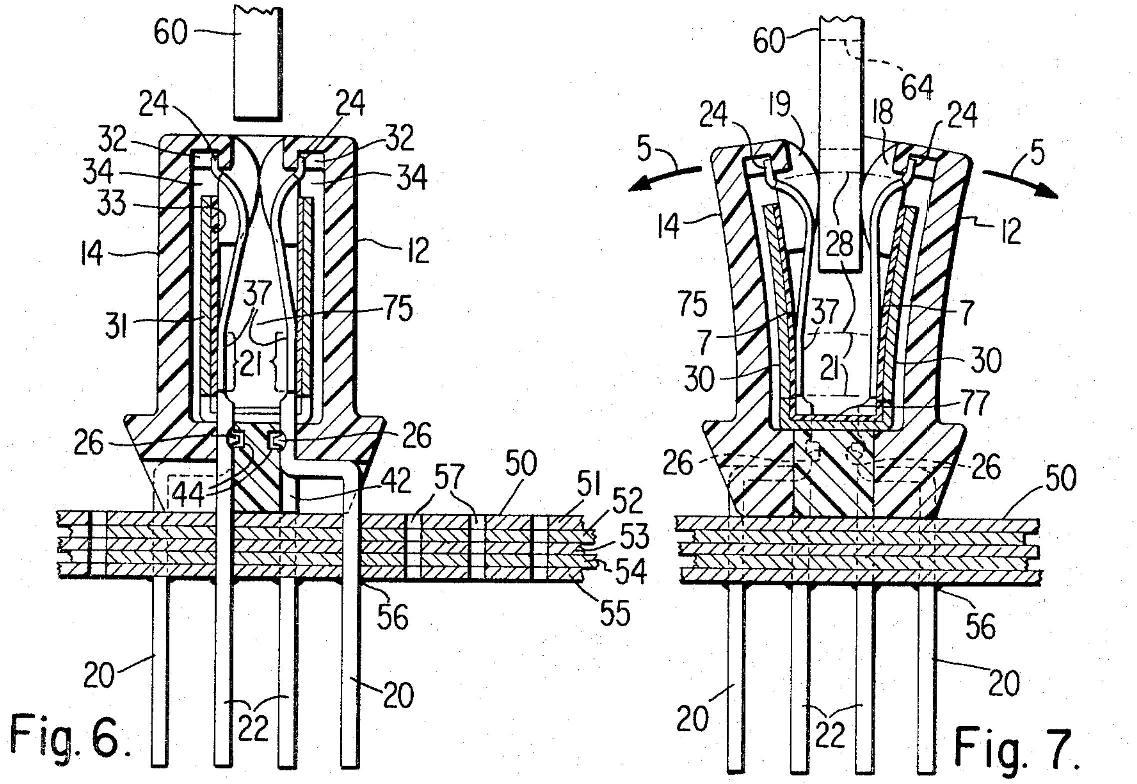
FIG. 6 is a cross sectional view showing the connector of FIG. 1 secured in place to a multi-layer interconnecting printed circuit board.
FIG. 7 is a cross sectional view showing the contact element shifting action which occurs when a printed circuit board is inserted into the connector of FIG. 1.

The significance to be attached to the projections 24 and 26 is that they permit the elements 20 and 22 to be detachably secured to the housing and permit displacement of portion 28. When projection 24 is displaced or shifted in a given direction with respect to projection 26, indicated by the arrows 5, the adjacent resilient portion 28 is also shifted in this given direction. To accomplish this shifting, portion 28 is made resiliently moveable in the direction of arrow 5. As shown in FIG. 7, by securing projection 26 in a relatively fixed position, projection 24 and portion 28 may be rotated generally about projection 26. Conversely, when a force is applied to bight 23 in the direction of arrow 5 such as that exerted by a printed circuit board conductor foil, projection 24 is also shifted therewith. Straight portion 21 generally has the same width and thickness as resilient portion 28 to permit repetitive flexing of portion 28 about the junction 7 intermediate portions 28 and 21. Means 30, to be later described, abuts portion 21 in area 37 to permit rotation of portion 28, which, when urged in direction 5 by a force on bight 23, rotates about junction 7.

Referring to FIG. 3, housing members 12 and 14 may be mirror images of each other, each being constructed of resilient thermoplastic material or the like. Each of these members has its sides 104 or 106 of suitable thickness to permit rotation or shifting of ends 108 and 110 with respect to bottom wall 77 which is a surface of member 40. Formed in the ends 108 and 110 are recesses 32 which communicate with channel 75. Recesses 32 are each adapted to receive and insulate from one another a separate projection 24 of elements 20 or 22. Recesses 32 are further adapted to permit displacement of projection 24 in the direction of arrow 5 a predetermined distance such that bights 23 of the opposed elements are shifted to receive circuit board 60 therebetween. Further, each recess 32 has a depending inner wall 43 distal sides 102 or 103, which wall abuts projection 24 on a surface of projection 24 which is facing the same general direction as the convex surface of bight 23 for preloading the contact elements.

Figures 4, 5:
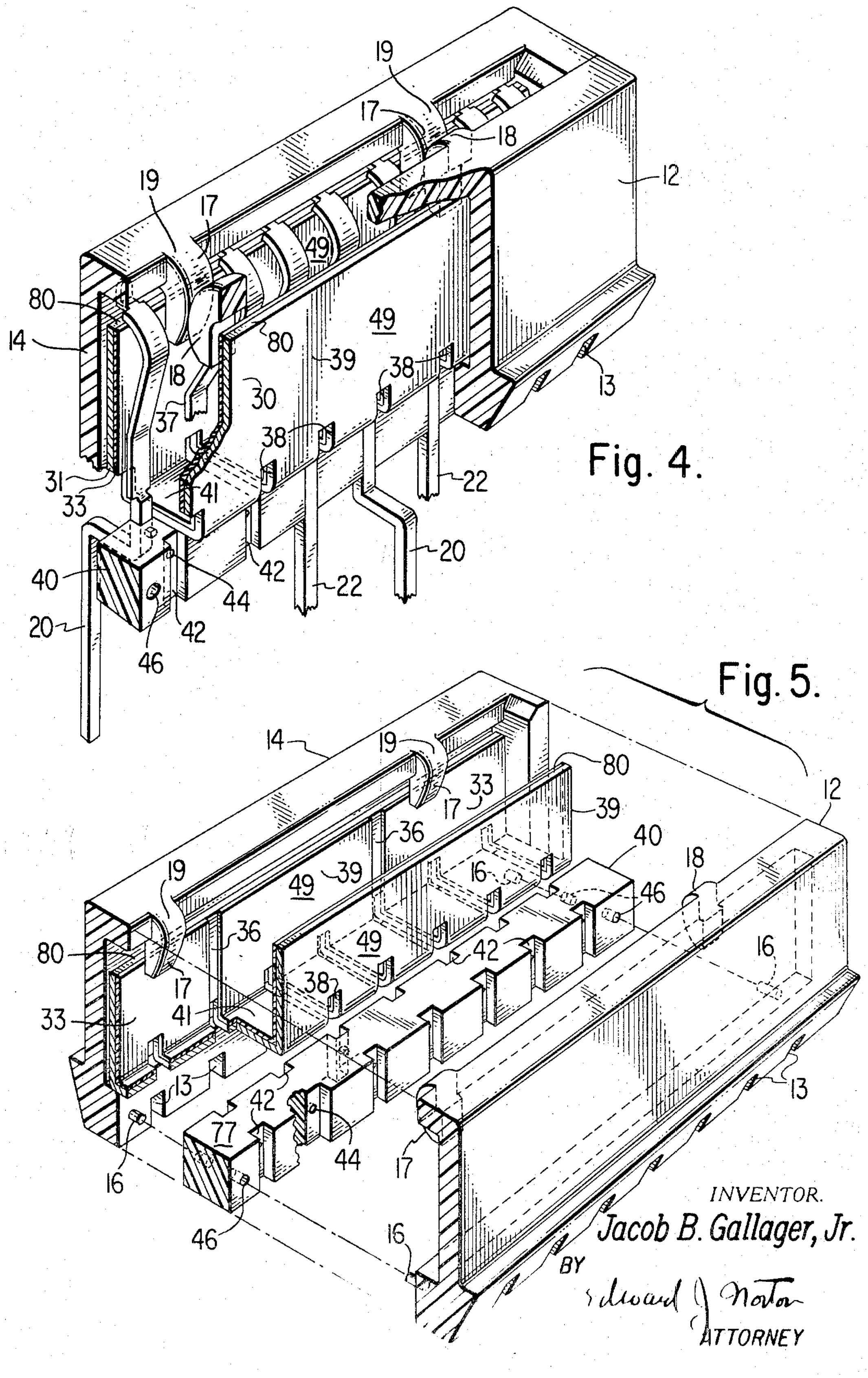
FIG. 4 is a cutaway perspective view of a portion of the connector of FIG. 1.
FIG. 5 is an exploded view illustrating the housing members and the impedance means of the connector shown in FIG. 1.

At the end of members 12 and 14 opposite ends 110 and 108, respectively, is disposed bottom wall 77 of channel 75 whose side walls are formed by members 12 and 14, as described. Bottom wall 77 is formed by interconnecting housing member 40 disposed between members 12 and 14. Referring to FIGS. 4 and 5, there are revealed the relationships between the members. Member 40 is elongated having disposed therein recesses 42 and 44. These recesses are spaced between member 40 and members 12 and 14, when the members are interconnected. However, recesses 42 and 44 may be in the alternative disposed in members 12 and 14. Recess 44 is adapted to engage projection 26 and recess 42 is adapted to engage shank 29. Other than positioning recesses 42 and 44 intermediate the separate housing members adjacent bottom wall 77, the specific details of recesses 42 and 44 are illustrative only. When the contact elements are placed in their respective recesses and when the housing members are secured abutting adjacent bottom wall 77, the elements are secured in fixed spaced relation to each other. Upon dismembering the housing in a manner to be described, the elements become detached therefrom.

Means connected to the housing members interconnect the housing members to each other. These means include like male members 16 on housing members 12 and 14 and holes 46 in member 40. Male and female means 16 and 46, respectively, secure members 12, 14 and 40 together when engaged. Members 14, 12 and 40 may be separated from each other in a conventional manner by separating members 12 and 14 from member 40. Upon the occurrance of this separation, the elements become detached from the housing members. These elements take a predetermined arrangement when secured to the housing according to the spaced relation between recesses 32 and 44. Fixturing means (not shown) secures the elements in this predetermined arrangement, enabling the housing members to be respectively attached and detached therefrom.

Figure 8:
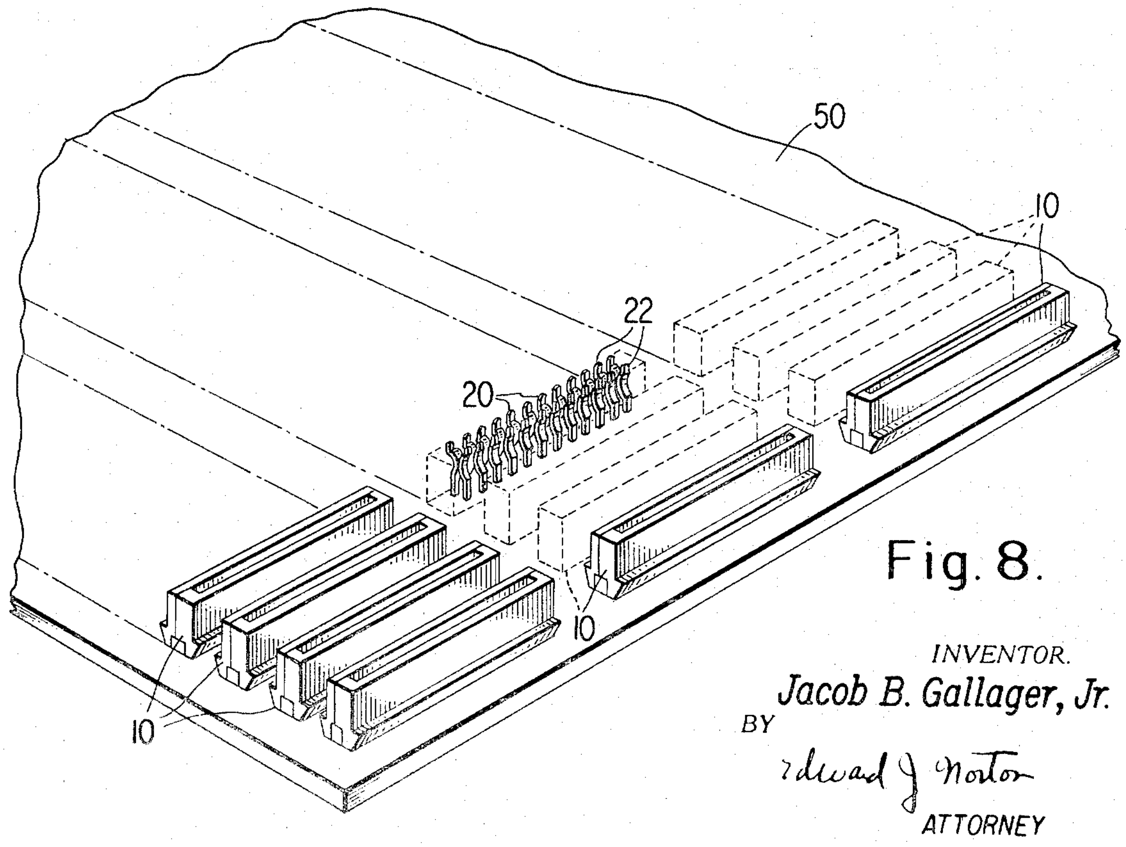
FIG. 8 is a perspective view showing a multilayer board and high density connector assembly in which the connector housing of one connector has been detached, illustrating the secured arrangement of the contact elements to the multilayer board.
Figure 9:
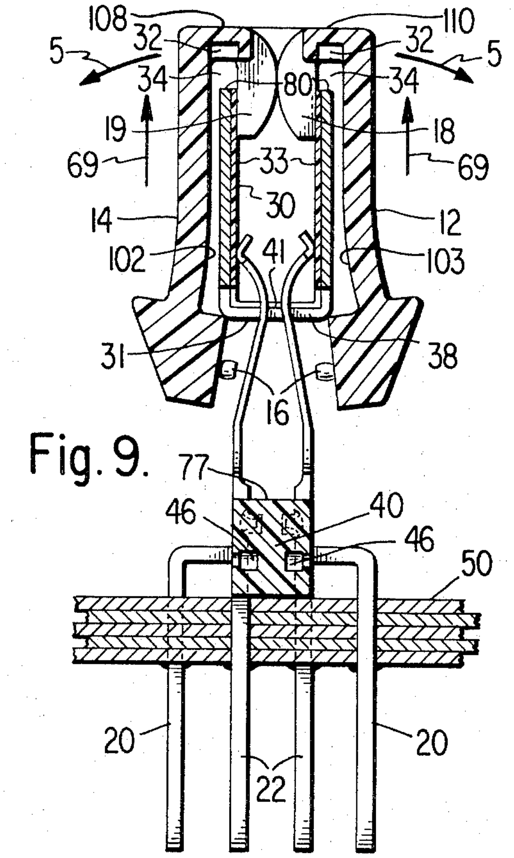
FIG. 9 is a cross sectional view showing a portion of the connector housing and the uniform impedance means in the state of being detached from the secured contact elements.
Figure 10:
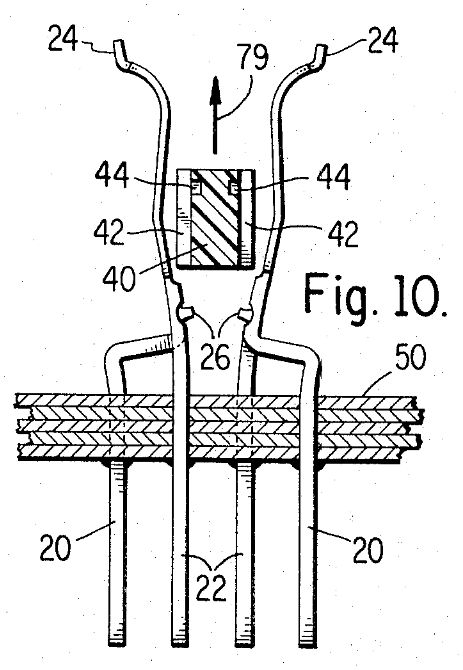
FIG. 10 is a cross sectional view similar to FIG. 9 in which the remaining housing portion is being detached from the secured contact elements.

The manner of detaching the housing is illustrated in FIGS. 9 and 10. FIG. 9 shows the initial detaching stage in which members 12 and 14 are separated from member 40. The contact elements 20 and 22, as illustrated, are secured to multilayer board 50. Means 50 in the alternative could be a printed board, a back-plane, an interconnecting board or other conventional lead means. By disengaging members 12 and 14 from member 40 and displacing members 12 and 14 in the direction of arrow 69, the housing is readily detached from the elements 20 and 22. However, member 40 remains secured to the elements by way of recesses 42 and 44 and projection 26. Member 40 is then detached from the elements by spreading elements 20 and 22 apart at shank 29. This disengages projection 26 from recess 44, and member 40 may be removed in direction 79. The contact elements are retained in the fixed arrangement by multilayer board 50 as shown in FIG. 8.

Referring to FIG. 3, adjacent ends 108 and 110 depending from members 14 and 12, respectively, are the contact shifting means, in particular surface projections 19 and 18, forming an inverted U-shaped cavity 34. Each of the cam surface projections include a convex surface 17 facing inwardly toward channel 75. The cam projections may be integral with their respective housing members from which they depend. FIGS. 4 and 5 show a perspective view of these cam projections. In FIG. 3, recesses 32 and their associate projections 24 are spaced adjacent these cam projections along an axis approximately equidistant from the bottom wall 77.

Convex bights 23 of the elements are spaced in communication with channel 75 such that projections 18 and 19 extend further inwardly from the channel walls than the convex bights 23. Thus, when a circuit board 60 (FIGS. 1, 6 and 7) is inserted into the channel, cam projections 18 and 19 are displaced in direction of arrow 5, shifting the bight 23 therewith beyond the insertion path 67 of the circuit board 60. Therefore, only the cam projections are in contact with the circuit board 60 during the circuit board's insertion into the housing channel.

When the circuit board 60 is inserted into the channel a predetermined depth such that the respective foil conductors 62 on the board are adjacent their respective contact elements 20 or 22, the cam projections enter recesses 64 in the printed circuit board 60, which recesses are adapted to receive projection 18 and 19, returning the respective housing walls 12 and 14 and the associate contact element to their unshifted state. As a result, sliding friction between the contact elements and the conductor 62 of the printed circuit board is substantially reduced. A minimum amount of wiping action may be maintained to insure good electrical contact. Projections 18 and 19 in addition to providing contact shifting action, also secure circuit board 60 to connector 10.

Impedance means 30 are provided to establish a predetermined impedance between each of the contact elements in the connector and a reference potential. That is, means 30 forms a transmission line with elements 20 and 22 that has a characteristic impedance of the circuitry associated with each respective one of the contact elements. This characteristic impedance may be the same for all the contact elements or may vary from one to the other according to the particular application of the associated circuitry.

Referring to FIGS. 3, 4, and 5, uniform impedance means 30 may include a conductive U-shaped member 31, each leg 39 being adjacent a channel side. Conductor 31 may be formed from a sheet of conductive material having a major surface 49 adjacent the contact elements and disposed between the housing members 14 and 12 and the contact elements 20 and 22. Disposed between the conductor 31 and the contact elements is insulation 33 having, for example, a uniform thickness. Member 31 may have a plurality of elongated holes 38 which are spaced in connecting leg 41 to pass elements 20 and 22 therethrough. Referring to FIG. 9, holes 38 permit means 30 to be detached from the contact elements in direction of arrow 69 when the housing members 12 and 14 are detached from housing member 40.

Preferably, insulation 33 is a coating applied to conductor 31. Insulation 33 may be any thermoplastic material or other dielectric, but in the preferred form, may be a coating of Teflon, a form of thermoplastic material. Means 30 at ends 80 of legs 39 extends into inverted U-shaped cavity 34 formed by the channel sides 102 and 103 and depending cam projections 18 and 19. By making the conductor 31 of resilient spring material such as a tempered beryllium or a like material, housing members 12 and 14 are resiliently urged opposite to direction of arrow 5 by means 30 preloaded at ends 80 against projections 18 and 19. Means 30 thus resiliently returns the shifted contact elements to their unshifted state and also contributes to secure members 12, 14 and 40 together at ends 108 and 110.

A source of reference potential, not shown, is connected to conductor 31 for establishing a reference potential on the conductor. This may be accomplished as shown in FIG. 5. Cutouts 36 of the coating 33 are provided to permit a predetermined one or more contact elements to register with conductor 31 at abutting area 37. The contact elements in registration with conductor 31 may also be conductively coupled to a predetermined conductor foil on the inserted circuit board, the conductor foil having the reference potential applied thereto. In FIG. 5, two cutouts 36 are shown. Fewer or greater members of these cutouts may be provided according to the particular circuit requirements. Another embodiment of means 30 is revealed by FIG. 11. The housing of FIG. 11 includes two members 82 and 84 joined together by means not shown. The contact elements may be disposed on one side of the channel 75 as is the cam surface projection 19 and uniform impedance means 90. Means 90 includes conductive sheet 91, and insulation sheet 93 disposed intermediate housing member 82 and contact elements 22. Means 90 may be readily detached from the housing upon detaching the housing members 82 and 84 from elements 22. Contact elements 22 are secured to the housing adjacent means 90 at area 97 similarly to means 30 at area 37 shown in FIG. 4. Regardless of the thickness of circuit board 60 inserted into the connector, the characteristic impedance between each of the contact elements and the conductor 91 remains the same due to the constant dielectric thickness at abutting area 97. Note that area 97 of the contacts abuts adjacent to the insulator 93. When a reference potential is applied to conductor 91, the capacitive coupling of conductor 91 to element 22 remains substantial constant regardless of the shifted position of the resilient portion 28. The connector of the present invention has an especially useful application such as that shown in FIG. 8, where the connectors are assembled to multilayer board 50. Multilayer board 50 may comprise a multi-layered circuit board as shown in FIG. 6, having multi-layers 51 - 55. The various layers include interconnecting conductors associated with predetermined ones of connecting apertures 57. The terminal portions 25 of the contact elements may be of the wire wrap type and the elements may be soldered or otherwise joined to the conductors of printed board 50 at location 56. Holes 57, not shown in FIG. 8, receive the terminal portions 25 of connector 10 according to predetermined interconnection patterns. However, conductors sandwiched between any of the layers 51 – 55 may be covered on the connector side of board 50 by connectors densely assembled to the back-plane 50. To obtain access to these sandwiched conductors, it has been found that by detaching the insulated housing from the inserted elements 20 and 22, access is made available to the board 50 without loss of the entire multilayer board and connector assembly as formerly was the case.

Fixturing, not shown, may be conveniently employed to assemble the contact elements 20 and 22 to the housing and uniform impedance means.

When a circuit board is inserted into the housing channel, a force is asserted on bight 23 of elements 20 and 22 which resiliently displaces projection 24 in recess 32. Consequently, the size of recess 32 is a function of the desired displacement of projection 24. Determining the recess size can be accomplished in a conventional manner. Projections 26 retain member 40 of the housing thereto when the elements are secured to the multilayer board 50. Therefore, member 40, being detachably secured to members 12 and 14, secures the entire housing to the multilayer.

The shoulder 27 in element 20 and the absence of this shoulder in element 22 are not part of this invention, and are shown only as a preferred form. This shoulder and its absence allow the elements to form a comb having four rows of elements as seen, for example, in FIGS. 6 and 7. Other shapes of contact elements incorporating projections 24 and 26 may also be readily devised within the scope of the invention. Insulation 33 or 93 is shown as a coating on conductors 31 and 91, respectively. It is apparent that insulation 33 may be a sheet of insulating material disposed adjacent conductor 31.

Figure 11:
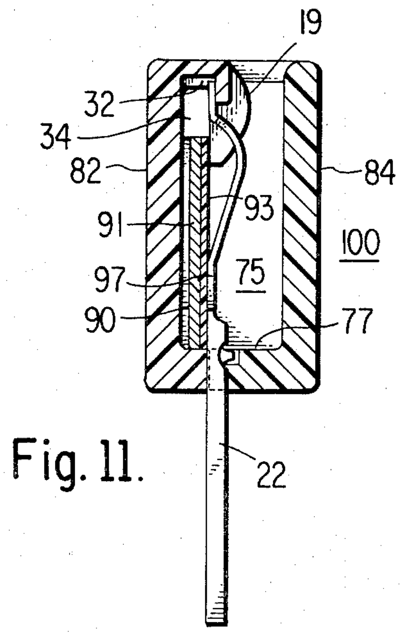
FIG. 11 is a cross sectional view illustrating the impedance and contact shifting means of the connector shown in FIG. 1.
Figure 12:
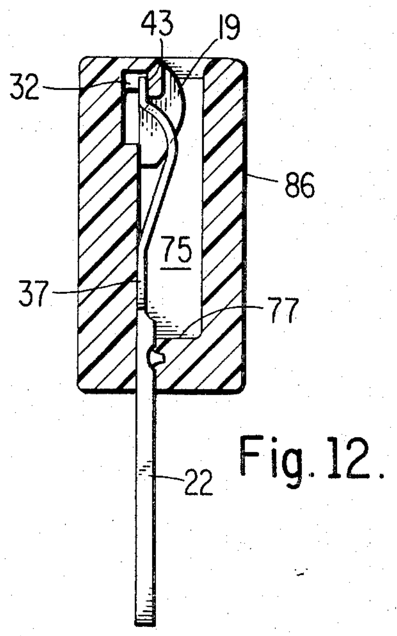
FIG. 12 is a cross sectional view further showing the contact shifting means.

Note that cam projections 18 and 19 are responsive to the insertion of a printed circuit board into channel 75 (FIG. 7). These cam projections in turn cause the shifting displacement of the contact elements. This shifting action takes place about an axis parallel to longitudinal axis of the channel. Further, that segment of the connector housing which is shifted is distal the closed bottom 77 of the channel 75. Therefore, the contact end adjacent projections 24 is shifted, while the housing members adjacent the closed bottom remain secured to each other in a fixed position. FIGS. 11 and 12 are shown to simplify the various features of the invention. Preferably, contact elements 20 and 22 are shown with their bights 23 facing each other in rows of opposed pairs. However, all the features of the invention may be present where the contact elements are secured to only one side of the housing in communication with the channel 75 as shown in FIG. 11. In addition, each of the features of the invention; the detachably secured contact elements, the contact shifting means, and the uniform impedance means, cooperatively function in the connector of FIG. 1, and further, each may be independently included in a connector separate of the other features. The cooperative function may be accomplished by uniform impedance member 30 which resiliently urges the contact shifting means in the unshifted state and also, in so doing, urges members 12 and 14 together at ends 108 and 110 cooperating with male and female securing means 16 and 46 to detachably secure the housing members to each other.

What is claimed is:

1. An electrical edge connector for a printed circuit board, comprising:
   - a set of flexible electrical contact elements,
   - an insulating connector housing for receiving a printed circuit board edgewise therein, said housing being removably attached directly to said contact elements, said elements being secured in a predetermined arrangement when said housing is attached thereto,
   - means connected to said housing for shifting said contact elements beyond the insertion path of said circuit board in response to the insertion of said board into said housing to substantially eliminate sliding friction between said contact elements and said circuit board;
   - means within said housing adjacent and removably attached to said contact elements including a conductor for providing a predetermined impedance between each respective one of said contact elements and said conductor, said impedance means being in contact with said contact shifting means for urging said housing and said contact in the secured state, and
   - means for connecting said conductor to a source of reference potential.

2. An electrical edge connector for securing a first printed circuit board to a second printed circuit board and for coupling the conductors on the boards to each other, the first printed circuit board having conductors disposed on at least one surface thereof terminating at one edge thereof, and including at least one recess adjacent said one edge disposed on at least one surface thereof, said connector comprising:
   - a set of elongated electrically conductive contact elements, each including a resilient contact portion, a terminal portion, and at least two projections depending from said element, one of said projections being disposed intermediate said two portions and the other projection being disposed at the end of said element adjacent said resilient portion, a housing including an insulating body having a channel formed therein and a plurality of spaced recesses in communication with said channel disposed in at least one side thereof, each of said recesses being adapted to engage a respective different one of said projections for removably attaching said housing to said contact elements, said elements having a predetermined arrangement when attached to said housing, said housing including two oppositely disposed members which cooperate to form the side walls of said channel, and further including means for removably securing one member to the other, means connected to said housing for shifting said contact elements beyond the insertion path of said first circuit board in response to the insertion of said board into said housing to substantially reduce sliding friction between said contact elements and said first circuit board, said shifting means including a cam surface projection extending inwardly from at least one of said side walls and spaced from the bottom of said channel, the portion of said one side wall adjacent said cam projection being shifted in cam follower response to the insertion of said circuit board into said channel, said cam projection being received by said circuit board recess for returning said one side wall to its unshifted state, and for securing said first board to said connector, each respective one of said end projections of the contact elements being disposed in the corresponding housing recess such that said end projection is shifted with said side wall to free the adjacent respective resilient portion of the contact element associated therewith from substantial contact with said first circuit board during said insertion, and means within said housing adjacent said contact elements including a conductive sheet and insulating means for providing predetermined impedance between each respective one of said contact elements and said conductive sheet, said sheet being disposed between said housing and said contact element such that a major surface area of said sheet is distributed uniformly adjacent said contact elements, said insulating means having substantially uniform thickness disposed between said sheet of conductive material and said contact elements for providing predetermined fixed impedance between each of said contact elements and said conductive sheet, and means for connecting said sheet to a source of reference potential.

3. The connector of claim 2, wherein said cam surface projection depends towards the channel bottom from said one side wall member forming a U-shaped cavity therebetween, said uniform impedance means having an edge thereof disposed within said cavity and an end opposing said edge adjacent said bottom and secured to another one of said housing members, said edge being resiliently moveable with respect to said secured end for resiliently restraining said side wall shifting and for removably securing said housing members to each other adjacent said cam projection.

4. An electrical edge connector for a printed circuit board, comprising:

a set of elongated flexible electrically conductive contact elements, an insulating connector housing for receiving a printed circuit board edgewise therein and detachably secured directly to said contact elements, said elements being secured in a predetermined arrangement when said housing is attached thereto, means within said housing adjacent and removably attached to said contact elements including a conductor for providing a predetermined impedance between each respective one of said contact elements and said conductor, said impedance means being in contact with said housing for urging said housing and said contacts in the secured state, and means for connecting said conductor to a source of reference potential.

5. An electrical edge connector for coupling a first printed circuit board to a second printed circuit board, the connector comprising:

a set of elongated electrically conductive contact elements, each including a resilient contact portion, a terminal portion, and at least two projections depending from said element, one of said projections being disposed intermediate said two portions and the other at the end of said element adjacent said resilient portion, a housing including an insulating body having a channel formed therein and a plurality of spaced recesses in communication with said channel disposed in at least one side thereof, each of said recesses being adapted to engage a respective different one of said projections for removably attaching said housing to said contact elements, said elements having a predetermined arrangement when attached to said housing, said housing including two oppositely disposed members which form the side walls of said channel, and further including means for removably securing one member to the other when attaching said elements to said housing, means within said housing adjacent to said contact elements including a conductive sheet and insulting means for providing a predetermined impedance between each respective one of said contact elements and said conductive sheet, said sheet being disposed between said housing and said contact elements such that the major surface area of said sheet is distributed uniformly adjacent said contact elements, and said insulating means having substantially uniform thickness disposed between said sheet of conductive material and said contact elements for providing predetermined fixed impedance between each of said contact elements and said conductive sheet, and means for connecting said sheet to a source of reference potential.

6. A multi-contact electrical connector for use with a printed circuit board, the combination comprising:

a set of flexible elongated electrically conductive contact elements each element being capable of flexing independently of the other elements, an insulating connector housing defining an open channel having upper and lower side wall portions and a base portion for receiving a printed circuit board edgewise therein, said housing being removably attached to said contact elements which are secured in a predetermined arrangement when said housing is attached thereto, and means connected to said housing for shifting said contact elements beyond the insertion path of said printed circuit board in response to the insertion of said board into said housing to substantially reduce sliding friction between said contact elements and said circuit board, said latter means including a cam projection integrally formed with said housing for bending at least one of said upper side wall portions relative to the respective lower side wall portion of that side wall, said upper side wall portion shifting said contact elements therewith.

7. A multi-contact electrical connector for connecting the conductors of a first printed circuit board to the conductors of a second printed circuit board, said connector covering a portion of the conductors of said latter board when affixed thereto, the connector comprising:

a set of elongated electrically conductive contact elements, each including a resilient contact portion, a terminal portion, and at least two projections depending from said element, one of said projections being disposed intermediate said two portions and the other at the end of said member adjacent said resilient portion, a housing for receiving a printed circuit board edgewise therein including an insulating body having a channel formed therein and a plurality of spaced recesses in communication with said channel disposed in at least one side thereof, each of said recesses being adapted to engage a respective different one of said projections for removably attaching said housing to said contact elements which are secured in a predetermined arrangement when attached to said housing, said housing including two oppositely disposed members which cooperate to form the side walls of said channel, and further including means for removably securing one member to the other, means connected to said housing for shifting said contact elements beyond the insertion path of said first circuit board in response to the insertion of said board into said housing to substantially eliminate sliding friction between said contact elements and said first circuit board, said shifting means including a cam surface projection extending inwardly from at least one of said side walls and spaced from the bottom of said channel, the portion of said one side wall adjacent said cam projection being shifted in cam follower response to the insertion of said circuit board into said channel, each respective one of said end projections of the contact element being disposed in the corresponding housing recess such that said end projection is shifted with said side wall to free the adjacent respective resilient portion of the contact element associated therewith from substantial contact with said first circuit board during said insertion.

8. In an electrical connector having an insulating body defining a channel therein and including electrical spaced contact elements secured in at least one row in communication with said channel, the combination comprising:

means connected to said body for shifting said contact elements beyond the insertion path of said circuit board in response to the insertion of said board into said channel to substantially eliminate sliding friction between said contact elements and said printed circuit board, means within said body adjacent said contact elements and in contact with said shifting means for urging said contact elements and said shifting means toward said channel, including a conductor for providing a predetermined impedance between each respective one of said contact elements and said conductor, and means for connecting said connector to a source of reference potential.

9. The connector of claim 8 wherein said shifting means including a cam surface projection extending inwardly from at least one of said side walls and spaced from the bottom of said channel, the portion of said one side wall adjacent said cam projection being shifted in cam follower response to the insertion of said circuit board into said channel, said contact elements each being secured to said one side wall for being shifted therewith, and said predetermined impedance means including a sheet of electrically conductive material disposed between said body and said secured contact elements such that a major surface area of said sheet is distributed uniformly adjacent said contact elements, and a dielectric having a predetermined thickness disposed between said sheet of conductive material and said contact elements for providing predetermined fixed impedance between each of said contact elements and said conductive sheet.

10. An electrical edge connector for a printed circuit board, comprising:

a set of elongated flexible conductive contact elements fixed in substantially parallel spaced relationship, said contact elements including a resilient portion and a terminal portion, an insulating body defining a channel therein including means for securing said contact elements in said fixed spaced relationship within said channel, said body including two side walls and an elongated bottom wall defining a channel therebetween, said side walls being resiliently movable distal said bottom wall about an axis parallel to the longitudinal axis of said bottom wall, means for mounting said contact elements in said fixed spaced relationship, said contact elements having their respective resilient portions secured to at least one of said side walls communicating with said channel, one end of each of said resilient portions being positioned distal said bottom wall and the other end proximal said bottom wall, and means connected to said housing for shifting said contact elements beyond the insertion path of the leading edge of said circuit board in response to the insertion of said board into said channel, said contact shifting means including at least one cam surface projection extending inwardly from at least one of said side walls and spaced from the bottom of said channel, said sides being shifted in cam follower response to the insertion of said first circuit board therebetween.

11. An electrical connector for use with a printed circuit board comprising:

a set of separate, elongated conductive contact elements fixed in substantially parallel spaced relationship, each element being capable of flexing independently of the other elements, an insulating housing for securing said contact elements in said fixed spaced relationship, and means within said housing adjacent said contact elements and in contact with said housing for urging said housing and said contact elements towards an inserted printed circuit board including a conductor for providing a predetermined impedance between each of said contact elements and said conductor, and means for connecting said conductor to a source or reference potential.

12. The connector of claim 11, wherein said impedance means including a conductive sheet and insulating means is removably attached within said housing between the housing and said contact elements.

13. The connector of claim 11, wherein said conductor cooperates with each of said contact elements to form a transmission line therewith having a predetermined characteristic impedance.

14. The connector of claim 11, wherein said sheet of electrically conductive material includes a major surface area distributed adjacent said contact elements and disposed between said housing and said contact elements, and a dielectric having a predetermined thickness disposed between said conductive sheet and said contact elements.

15. The connector of claim 14, wherein said dielectric includes a coating of insulating material having substantially uniform thickness disposed on one surface of said sheet.

16. An electrical connector for use with a printed circuit board comprising:

a set of separate elongated conductive contact elements fixed in substantially parallel spaced relationship, each element being capable of flexing independent of the other elements, said elements including a resilient contact portion, and a terminal portion, an insulating housing for securing said contact elements in said fixed spaced relationship, said housing including a channel, means for securing said contact elements in parallel spaced relation such that their resilient portions are in communication with the channel in a row of opposed substantially parallel pairs and the terminal portion extends through the channel bottom, means within said housing adjacent said contact elements and in contact with said housing for urging said housing and said contact elements toward an inserted printed circuit board including a conductor for providing a predetermined impedance between each of said contact elements and said conductors, and means for connecting said conductor to a source of reference potential, said impedance means including a channel shaped member formed from a sheet of conductive material disposed within the channel of said housing intermediate said housing and said contact elements, said channel shaped member including a plurality of spaced apertures to pass said contact members therethrough, and further including a dielectric coating disposed on the surface adjacent said contact elements, said coating having a uniform thickness.

17. In an electrical connector having an insulating body defining a channel therein and including electrical spaced contact elements secured in at least one row in communication with said channel for use with a printed circuit board, the combination comprising:

means connected to said body for shifting said contact elements beyond the insertion path of said circuit board in response to the insertion of said board into said channel to substantially eliminate sliding friction between said contact elements and said printed circuit board, and means including a spring member disposed within said body adjacent said contact elements and in contact with said shifting means for urging said contact elements and said shifting means toward said channel.

18. An electrical connector having an insulating body having a spaced array of resilient metallic contacts, said insulating body comprising:

two opposing members, each having a base portion having means for engaging a base spacing member, a substantially upright side portion, and an upper portion having means for receiving the upstanding sides of a u-shaped spring;

a base spacing member having means for engaging said resilient metallic contacts, thereby aligning and retaining said contacts within said electrical connector, and means for engaging said opposing members engaging means, and a u-shaped spring having upstanding sides for engaging said receiving means of said upper portions of said opposing members.

19. An electrical connector having an insulating body having a spaced array of resilient metallic contacts, said insulating body comprising:

two opposing members, each having a base portion, a substantially upright side portion, and an upper portion having means for receiving the upstanding sides of a u-shaped spring;

a base spacing member having means for engaging said resilient metallic contacts, thereby aligning and retaining said contacts within said electrical connector, a U-shaped spring having upstanding sides for engaging said receiving means of said upper portions of said opposing members, and means connected to said body for coupling said base portions to said base spacing member.

* * * * *